US009464244B2

(12) United States Patent
Mani et al.

(10) Patent No.: US 9,464,244 B2
(45) Date of Patent: Oct. 11, 2016

(54) SYSTEM AND METHOD FOR BLACK WATER REMOVAL

(71) Applicant: General Electric Company, Schenectady, NY (US)

(72) Inventors: Nithyanandam Mani, Bangalore (IN); Annavarapu Vijay Bharat Sastri, Bangalore (IN)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 14/191,400

(22) Filed: Feb. 26, 2014

(65) Prior Publication Data

US 2015/0240171 A1 Aug. 27, 2015

(51) Int. Cl.

| B01J 7/00 | (2006.01) |
|---|---|
| C01B 3/36 | (2006.01) |
| C10J 3/52 | (2006.01) |
| C10J 3/72 | (2006.01) |
| C10J 3/84 | (2006.01) |
| C10K 1/10 | (2006.01) |

(52) U.S. Cl.
CPC ............... C10J 3/526 (2013.01); C10J 3/723 (2013.01); C10J 3/845 (2013.01); C10K 1/101 (2013.01); *C10J 2300/169* (2013.01); *C10J 2300/1628* (2013.01); *C10J 2300/1807* (2013.01); *Y02E 20/16* (2013.01); *Y02E 20/18* (2013.01)

(58) Field of Classification Search
CPC .... C10J 2300/169; C10J 3/526; C10J 3/845; C10K 1/10
See application file for complete search history.

(56) References Cited

U.S. PATENT DOCUMENTS

| 5,647,876 A * | 7/1997 | Winter .................... C10J 3/845 205/771 |
|---|---|---|
| 2001/0026783 A1* | 10/2001 | Winter ................ B65G 33/265 422/271 |
| 2002/0043023 A1* | 4/2002 | Davis, Jr. ................. C10J 3/00 48/69 |
| 2003/0015483 A1* | 1/2003 | Hwan ....................... C10J 3/54 210/800 |
| 2006/0165582 A1* | 7/2006 | Brooker ................... C10J 3/466 423/414 |
| 2008/0047198 A1* | 2/2008 | Mehlhose ............... C10J 3/466 48/210 |
| 2009/0178338 A1* | 7/2009 | Leininger ................ C10J 3/30 48/86 R |
| 2013/0183204 A1* | 7/2013 | Benipal .................... B01D 3/06 422/187 |
| 2013/0327028 A1* | 12/2013 | Steele ..................... C10J 3/526 60/327 |
| 2014/0047975 A1* | 2/2014 | Mazumdar ............... C02F 1/66 95/1 |
| 2015/0159097 A1* | 6/2015 | Yen ......................... C10J 3/845 48/128 |

FOREIGN PATENT DOCUMENTS

EP 0996491 B1 10/2005

* cited by examiner

*Primary Examiner* — Imran Akram
(74) *Attorney, Agent, or Firm* — Fletcher Yoder, P.C.

(57) ABSTRACT

A system including a gasifier that may remove black water and includes a reactor and a quench chamber disposed downstream of the reactor. The quench chamber may cool a syngas generated in the reactor. The system also includes a syngas treatment system that may supply the gasifier with a first portion of a quench liquid via a first inlet and a second portion of the quench liquid via a second inlet; a lock hopper that may receive gasification by-products generated in the reactor and supply a third portion of the quench liquid to the gasifier via a third inlet, and a deaerator coupled to the syngas treatment system and the lock hopper. The deaerator may depressurize the lock hopper.

19 Claims, 3 Drawing Sheets

SYSTEM AND METHOD FOR BLACK WATER REMOVAL

BACKGROUND

The subject matter disclosed herein relates to gasification systems and, more particularly, to systems for removing black water.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas combusts more efficiently and cleaner than the fuel in its original state before gasification. In addition to the syngas, gasification may also generate several by-products such as fine particles of ash, metals, ammonia, and organic matter. Accordingly, prior to use, the syngas may be cooled to separate the by-products from the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system is provided. The system includes a gasifier that may remove black water and includes a reactor and a quench chamber disposed downstream of the reactor. The quench chamber may cool a syngas generated in the reactor. The system also includes a syngas treatment system that may supply the gasifier with a first portion of a quench liquid via a first inlet and a second portion of the quench liquid via a second inlet; a lock hopper that may receive gasification by-products generated in the reactor and supply a third portion of the quench liquid to the gasifier via a third inlet, and a deaerator coupled to the syngas treatment system and the lock hopper. The deaerator may depressurize the lock hopper.

In a second embodiment a method is provided. The method includes providing a gasifier with a fuel. The gasifier includes a reactor and a quench chamber. The method also includes gasifying the fuel within the reactor to generate a syngas and supplying a quench liquid to the gasifier. A quench ring may receive a first portion of the quench liquid from a syngas treatment system to cool at least a portion of the syngas within a dip tube of the gasifier. The method also includes adding a second portion, a third portion, or a combination thereof of the quench liquid to the gasifier. The second and the third portions of the quench liquid are added to the quench chamber and the second and the third portions of the quench liquid are compositionally distinct.

In a third embodiment a system is provided. The system includes a vessel that includes a reactor that may gasify a fuel to generate a syngas and a quench ring that may receive a first quench fluid. The first quench fluid cools at least a portion of the syngas. The system also includes a quench chamber that may receive a second quench fluid. The quench chamber includes two or more inlets that may supply the second quench fluid to the quench chamber. The second quench fluid includes a first portion that includes black water, a second portion that includes fresh makeup water, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Various industrial processes involve the handling of black water. Black water may include gasification by-products (e.g., slag, unconverted carbon, etc.) dispersed in a fluid, such as water. In certain situations, the black water may be processed in a black water treatment system prior to disposal or use in other gasification processes. Black water treatment systems may occupy a large footprint and may be costly to operate due to the energy used to run such systems. Therefore, it may be desirable to provide alternative methods for removing and/or decreasing an amount of black water generated during the gasification process. As discussed in detail below, present embodiments include a gasification system configured to remove and decrease an amount of black water generated during the gasification process. For example, by increasing quench vaporization levels (e.g., water vaporization/moisture content) within a quench chamber of the gasification system, the amount of black water generated during cooling of syngas and gasification by-products may be decreased in certain embodiments. Additionally, in certain embodiments, circulating black water generated in a syngas treatment system (e.g., a scrubber) to the gasifier may facilitate removal of the black water. Gasification systems configured as described in the disclosed embodiments may decrease an overall amount of black water generated during gasification and may also remove approximately 90% to 100% of unconverted carbon and other solid particulates without the use of a black water treatment system.

Figure 1:
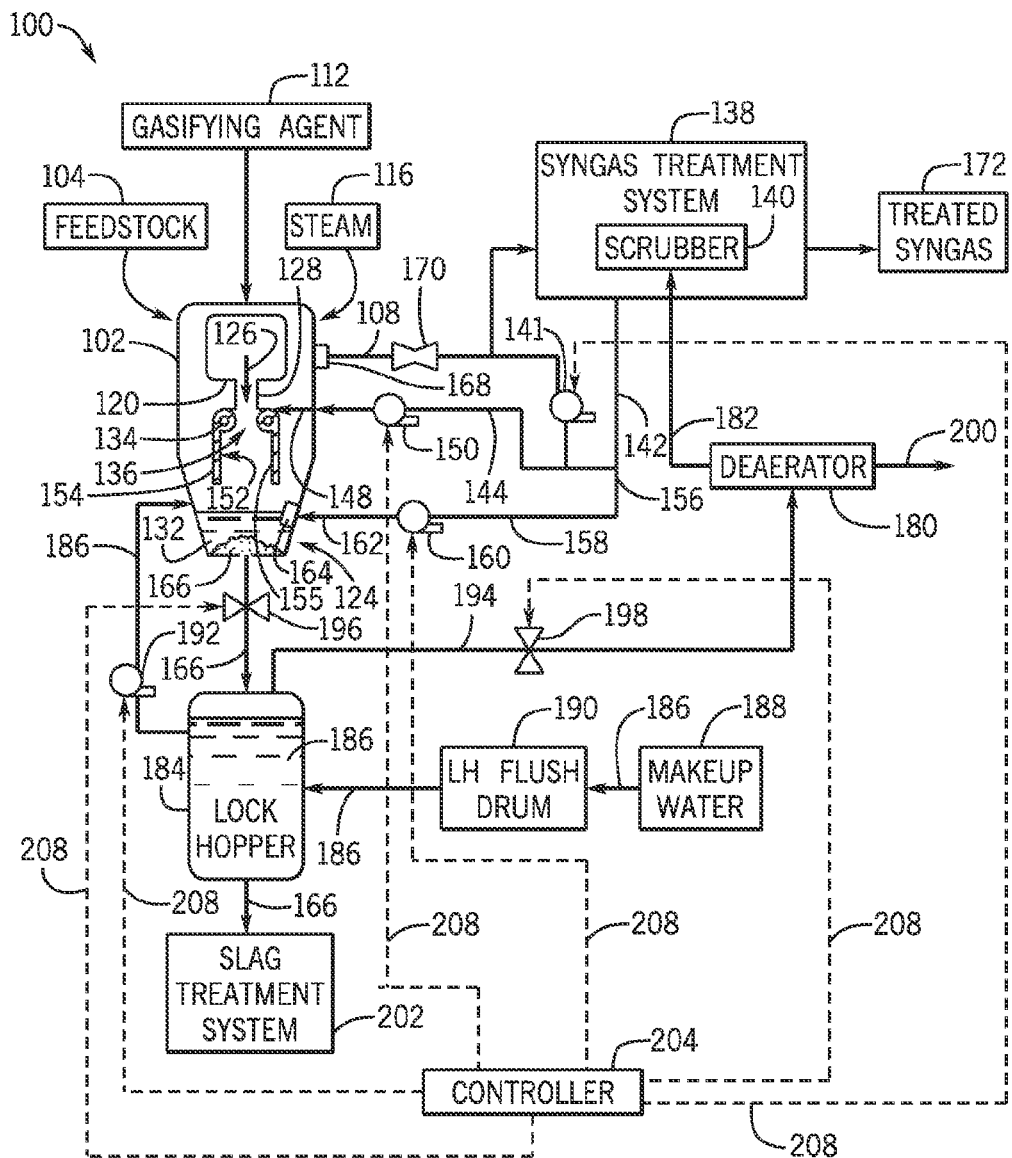
FIG. 1 is a schematic block diagram of an embodiment of a gasification system configured to circulate one or more quench liquids to a gasifier.

With the foregoing in mind, FIG. 1 is a schematic diagram of an embodiment of a gasification system 100 configured to remove black water without the use of a black water treatment system. As shown in FIG. 1, the gasification system 100 may include a gasifier 102 configured to gasify a feedstock 104 to generate an untreated syngas 108. The feedstock 104 may include coal, petroleum coke, coal and coke blends, biomass, wood-based materials, agricultural wastes, tars, coke oven gas and asphalt, or other carbon containing materials. The feedstock 104 may be resized or reshaped, for example, by chopping, milling, shredding, pulverizing, briquetting, or pelletizing the feedstock 104 prior to entering the gasifier 102. Additionally, the feedstock 104 may include additives, such as water, to create a fuel slurry. However, in other embodiments, the feedstock 104 may enter the gasifier 102 as a dry feedstock. The gasifier 102 may be part of an integrated gasification combined cycle (IGCC) power plant or any other variety of plants that use or produce a syngas. The gasifier 102 may be an updraft or downdraft fixed-bed gasifier, a fluidized-bed gasifier, such as a bubbling fluidized-bed gasifier or a circulating fluidized-bed gasifier, moving bed gasifier, or an entrained flow gasifier.

While in the gasifier 102, the feedstock 104 may be mixed with a gasifying agent 112 (e.g., oxygen) and steam 116 within a reactor 120 to produce the untreated syngas 108. In particular, the feedstock 104 may be reacted with a limited amount of the gasifying agent 112 (e.g., partial oxidation) at elevated pressures (e.g., from absolute pressures of approximately 20 bar to 85 bar) and temperatures (e.g., approximately 700° C. to 1600° C.) to partially oxidize the feedstock 104 and generate the untreated syngas 108. Due to chemical reactions between the gasifying agent 112, steam 116, and carbon within the feedstock 104, the untreated syngas 108 may include hydrogen, carbon monoxide, water, ammonia, hydrogen sulfide, methane, and carbon dioxide, as well as other less desirable components, such as ash, sulfur, nitrogen, and chloride, present in the carbonaceous fuel. In addition, the untreated syngas 108 may include unconverted carbon (e.g., feedstock that did not participate in gasification reactions).

The gasifier 102 may also include a quench chamber 124 downstream of the reactor 120. The quench chamber 124 may separate and cool the untreated syngas 108 from gasification by-products (e.g., molten slag). Within the reactor 120, the feedstock 104 may be heated to undergo a pyrolysis process. According to certain embodiments, temperatures inside the reactor 120 during the pyrolysis process may range from approximately 150° C. to 700° C., depending on the type of feedstock 104 utilized. The heating of the feedstock 104 during the pyrolysis process may generate a solid, e.g., char, and residue gases, e.g., carbon monoxide, water, methane, and hydrogen. The quench chamber 124 of the gasifier 102 may receive the untreated syngas 108 and the gasification by-products, as indicated by arrow 126, as they leave the reactor 120 through a bottom end 128 (or throat) of the reactor 120. In general, the quench chamber 124 may be used to reduce the temperature of the untreated syngas 108, to disengage the gasification by-products (e.g., molten slag) from the untreated syngas 108, and to quench the gasification by-products. In certain embodiments, a quench liquid 132 (e.g., water) may flow through the bottom end 128 and fill the quench chamber 124 to facilitate cooling of the untreated syngas 108 and gasification by-products (e.g., molten slag). For example, as the untreated syngas 108 and gasification by-products flow through the bottom end 128 (e.g., arrow 126), at least a portion of the quench liquid 132 within the quench chamber 124 may vaporize by extracting heat from the untreated syngas 108 and molten slag, resulting in cooling of the untreated syngas 108 and the molten slag. Vaporization of the quench liquid 132 may generate steam that may be utilized in other gasification processes downstream of the gasifier 102. In certain embodiments, quench vaporization levels within the quench chamber 124 may be between approximately 50% to 80%. In other embodiments, quench vaporization levels within the quench chamber 124 may be between approximately 90% and 100%.

A quench ring 134, located at the bottom end 128 (e.g., at an entrance 136 of the quench chamber 124), may be configured to provide the quench liquid 132 (e.g., water) to the quench chamber 124. In certain embodiments, the quench ring 134 may receive quench liquid 132 from a syngas treatment system 138. For example, the syngas treatment system 138 may include a scrubber 140 that utilizes water to remove residual particulates (e.g., slag, soot, unconverted carbon, etc.) and other components from the untreated syngas 108 that may have been carried over from the gasifier 102, generating black water. The scrubber 140 may be configured to supply the black water (e.g., the quench liquid 132) to the quench ring 134. In the illustrated embodiment, the scrubber 140 may be coupled to a nozzle scrubber pump 141 and quench water pump 150. The quench water pump 150 (e.g., a centrifugal pump) may facilitate a flow of black water 142 into the quench ring 134 via quench ring line 144. The quench ring 134 may received the first portion of black water 142 through a line 148. The nozzle scrubber pump 141 may facilitate control of the flow of black water to quench chamber 124. For example, when the quench liquid level in the quench chamber 124 is high, the nozzle scrubber pump 141 may increase a recycle portion of black water (e.g., the first portion of black water 142) exiting the scrubber 140 to reduce a flow of additional black water (e.g., a second portion of black water 156) to a quench chamber line 162 via quench level pump 160. In general, the black water 142 may flow through the quench ring 134 and down an inner surface 152 of a dip tube 154 into the quench chamber 124. While flowing along the dip tube 154, between approximately 1% to 10% of the black water 142 may vaporize and quench the untreated syngas 108 and the gasification by-products (e.g., molten slag). For example, the high temperature of the untreated syngas 108 and the gasification products flowing from the reactor 120 (e.g., arrow 126) may cause vaporization of the first portion of the black water 142 flowing down the dip tube 154. Therefore, latent heat of evaporation of the black water 142 is extracted from the untreated syngas 108 and the molten slag, causing a decrease in temperature of the untreated syngas 108 and molten slag. In certain embodiments, the quench ring 134 and at least a portion of the inner surface 152 may have a protective barrier 155 to mitigate dry out (e.g., total evaporation of black water 142) in portions of the dip tube 154 during passage and cooling of the untreated syngas 108 and gasification by-products (e.g., arrow 126) through the dip tube 154. The protective barrier 155 may include refractory materials such as, but not limited to, niobium (Nb), molybdenum (Mo), tantalum (Ta), tungsten (W), rhenium (Re), or any other suitable refractory material and combinations thereof. In other embodiments, the quench ring 134 and the inner surface 152 may not include the protective barrier 155.

In addition to flowing the first portion of black water 142 to the quench ring 134 via quench ring line 144, the nozzle scrubber pump 141 may also be configured to control the flow of a second portion of black water 156 from the scrubber 140 to the quench chamber 124 via quench chamber line 158. Similar to the quench ring line 144, the quench chamber line 158 may include the quench level pump 160 to facilitate a flow of the second portion of black water 156 into the quench chamber 124 via quench chamber inlet 164. The second portion of black water 156 may supply the quench chamber 124 with additional quench liquid 132 to allow the quench chamber 124 to operate at quench vaporization levels of between approximately 90% to 100% and maintain cooling efficiency. As in the dip tube 154, the untreated syngas 108 and the molten slag pass through the quench chamber 126 causing vaporization of the quench liquid 132 (e.g., first and second portions of black water 142 and 156) within the quench chamber 124. The vaporization of the quench liquid 132 may cool the untreated syngas 108 and the molten slag. Cooling of the untreated syngas 108 and the molten slag may promote separation of the untreated syngas 108 from the molten slag. In addition, the molten slag may solidify to form slag 166 that accumulates at the bottom of the quench chamber 124. Subsequently, the untreated syngas 108 may exit the gasifier 102 through an outlet 168 coupled to a nozzle scrubber 170 and into the syngas treatment system 138. Moreover, because the second portion of black water 156 may have unconverted carbon particles (e.g., from the untreated syngas 108), the unconverted carbon particles may be removed from the gasification system 100 during removal of the slag 166. As should be appreciated, the first portion of black water 142 may also include unconverted carbon particles.

While in the syngas treatment system 138, the untreated syngas 108 may be treated to remove additional fines (e.g., unconverted carbon) and other entrained gasses, such as hydrogen chloride, ammonia, hydrogen sulfide, hydrogen fluoride, and others to generate a treated syngas 172. For example, the untreated syngas 108 may flow into the scrubber 140 to remove fines (e.g., unconverted carbon) that may have been carried by the untreated syngas 108 after exiting the gasifier 102. The scrubber 140 may receive fluid (e.g., demineralized water) from a deaerator 180 via scrubber line 182. The fluid from the deaerator 180 may facilitate removal of the unconverted carbon from the untreated syngas 108 and produce a stream of black water (e.g., first and second portions of black water 142 and 156). The black water may be circulated (e.g., continuously or in batch mode) to the gasifier 102, rather than to a black water treatment system, to supply the quench ring 134 and the quench chamber 124 with the quench liquid 132, as discussed above. In this way, the black water (e.g., first and second portions of black water 142 and 156), and consequently the unconverted carbon, may be returned to the gasifier 102 and removed from the gasification system 100 with the slag 166. In addition to the scrubber 140, the syngas treatment system 138 may also include other components, such as a shift reactor, a low temperature gas cooling (LTGC) train, and/or an acid gas removal (AGR) unit, to remove any other remaining undesirable impurities (e.g., diluents, $N_2$, acid gases, etc.) from the untreated syngas 108 to generate the treated syngas 172. The treated syngas 172 may then be used for a variety of processes such as chemical processing or power generation (e.g., gas turbine, etc.).

As discussed above, the slag 166 may accumulate at the bottom of the quench chamber 124. During or after the gasification process, the slag 166 may be released from the gasifier 102 and flow into a lock hopper 184 disposed downstream of the gasifier 102. In certain embodiments, the slag 166 may exit the gasifier 102 as a slurry (e.g., slag 166 and quench liquid 132). This slurry may also be referred to as black water. The slag 166 may have between approximately 20% to 60% water content after exiting the gasifier 102, depending on the quench vaporization levels of the quench chamber 124. Prior to removal of the slag 166 from the gasifier 102, the lock hopper 184 may be filled with a liquid (e.g., water) to further cool the slag 166. For example, the slag 166 being discharged from the gasifier 102 may have a high temperature (e.g., between approximately 150 to 350 degrees C., 200 to 300 degrees C., or 225 to 275 degrees C.). As such, the slag 166 may be cooled to temperatures below 100° C. to decrease flash vaporization during removal of the slag 166 from the lock hopper 184.

In certain embodiments, the lock hopper 184 may be filled with fresh makeup water 186. The fresh makeup water 186 may be provided to the lock hopper 184 from a makeup water drum 188. A lock hopper flush drum 190 may facilitate transfer of the fresh makeup water 186 from the makeup water drum 188 to the lock hopper 184 by providing a pressure differential between the lock hopper 184 and the makeup water drum 188. As such, the fresh makeup water 186 may flow into the lock hopper 184. Utilizing the fresh makeup water 186 may reduce scaling formation and plugging of the gasification system 100 components downstream of the gasifier 102. For example, the slag 166 may have various compositions of solids, including, but not limited to, char (i.e. partially reacted fuel), unconverted carbon, minerals (e.g., calcium, magnesium, and sodium), and solidified ash particles of various sizes. Certain solids within the slag 166 (e.g., calcium, magnesium, and sodium) may form scale deposits and cause plugging of gasification lines downstream of the gasifier 102. By utilizing the fresh makeup water 186, scale formation may be decreased due to a reduced alkalinity of the fresh makeup water 186 compared to recycled grey water.

Once released from the gasifier 102, the slag 166 may accumulate in the lock hopper 184. The lock hopper 184 may receive the slag 166 continuously or in batches. Because the lock hopper 184 is filled with the fresh makeup water 186, the fresh makeup water 186 may be displaced during addition of the slag 166. Accordingly, the fresh makeup water 186 may flow into the gasifier 102 and provide additional quench liquid 132 to the quench chamber 124. A lock hopper pump 192 may facilitate displacement of the fresh makeup water 186 into the quench chamber 124. By circulating the fresh makeup water 186, in addition to the first portion of black water 142, the second portion of the black water 156, or a combination thereof, the quench chamber 124 may receive a continuous or batch flow of quench liquid 132 (e.g., fresh makeup water 186 and first and/or second portions of black water 142 and 156), and facilitate operation of the quench chamber 124 at quench vaporization levels of between approximately 90% and 100%.

In certain embodiments, the lock hopper 184 may be configured to provide a residence time of approximately 2 hours to 5 hours to allow the slag 166 and other particulates (e.g., those from first and second portions of black water 142 and 156) to settle out of the makeup water 186 within the lock hopper 184, for example by gravity. This may reduce an amount of particulates flowing back into the quench chamber 124 via the lock hopper pump 192. In certain embodiments, the fresh water 186 may also pass through one or more filters disposed between the lock hopper 184 and the quench chamber 124 to remove any suspended particulates from the fresh water 186 prior to entering the quench chamber 124.

As discussed above, the gasification system 100 may be configured to remove black water (e.g., the first and/or second portions of black water 142 and 156) through the lock hopper 184. This may facilitate removal of between approximately 95% to 100% of unconverted carbon. For example, untreated syngas (e.g., the untreated syngas 108) may generally contain between approximately 20% to 40% unconverted carbon. This unconverted carbon may be removed in the scrubber 140. Because the black water (e.g., the first and second portions of black water 142 and 156) may be circulated to the gasifier 102 (e.g., to the quench ring 134 and the quench chamber 124, respectively), the unconverted carbon from the untreated syngas 108 may be combined with the slag 166 in the quench chamber 124. Notably, the second portion of black water 156 may contain more of the unconverted carbon (e.g., approximately 85% to 100%) from the untreated syngas 108, compared to the first portion of black water 142, due to being downstream of the first portion of black water 142. Similarly, the slag 166 may contain between approximately 60% to 80% of the unconverted carbon that may have been mixed with the molten slag during the gasification process. Therefore, upon removal of the slag 166 and non-vaporized black water (e.g., from first and second portions of black water 142 and 156) from the gasifier 102, approximately 95% to 100% of the unconverted carbon may be removed.

In certain embodiments, the lock hopper 184 may be depressurized prior to removing the slag 166 and black water from the lock hopper 184. In addition to having a high temperature, the slag 166, including any of the first and second portions of black water 142 and 156, being discharged from the gasifier 102 may have a high pressure (e.g., upstream pressure). The pressure of the slag 166, and consequently the lock hopper 184, may be between approximately 100 to 10,000 kPa, 2,000 to 9,000 kPa, or 3,000 to 8,000 kPa. In some embodiments, the lock hopper 184 may be depressurized by a vacuum flash drum downstream of the lock hopper 184. In other embodiments, the lock hopper 184 may be depressurized by the deaerator 180. For example, in the illustrated embodiment, the lock hopper 184 is coupled to the deaerator 180 via a depressurization line 194. Because the deaerator 180 may operate at a lower pressure relative to the gasifier 102 and the lock hopper 184, a pressure differential between the lock hopper 184 and the deaerator 180 may facilitate depressurization of the lock hopper 184. Accordingly, once the lock hopper 184 has been filled to a fill level, a valve 196 may be closed to block additional slag 166 from entering the lock hopper 184. Subsequently or concurrently, the lock hopper pump 192 may suspend a flow of the fresh makeup water 186 to the quench chamber 124. To release the pressure within the lock hopper 184, a depressurization valve 198 may be opened and pressurized gasses may flow out through the depressurization line 194 and into the deaerator 180. The gasses may then flow out of the deaerator 180, as indicated by arrow 200, for further processing (e.g., in a gas treatment system). Once depressurized, the slag 166, and consequently any black water from the quench chamber 124 and scrubber 140, may be removed from the lock hopper 184 and directed to a slag processing system 202 where the slag 166 may be screened to reduce moisture (e.g., water content) and then directed to an offsite disposal facility. For example, the slag 166 may be used as road base or as another building material. According to certain embodiments, the slag processing system 202 may include a drag conveyer and/or a slag sump. After removal of the slag 166 from the lock hopper 184, the lock hopper 184 may be filled with the fresh makeup water 186, and subsequently provide the quench chamber 124 with the quench liquid 132, as discussed above.

The gasification system 100 may also include a controller 204 to govern operation of the gasification system 100. The controller 204 may independently control operation of the gasification system 100 by electrically communicating with sensors, control valves (e.g., valves 196 and 198), and pumps (e.g., pumps 141, 150, 160, and 192) or other flow adjusting features throughout the gasification system 100. The controller 204 may include a distributed control system (DCS) or any computer-based workstation that is fully or partially automated. For example, the controller 204 can be any device employing a general purpose or an application-specific processor, both of which may generally include memory circuitry for storing instructions such as gasification parameters (e.g., the gasification conditions of the feedstock 104). The processor may include one or more processing devices, and the memory circuitry may include one or more tangible, non-transitory, machine-readable media collectively storing instructions executable by the processor to perform the acts of FIG. 3, as discussed below, and control actions described herein.

In one embodiment, the controller 204 may operate control devices (e.g., valves, pumps, etc.) to control amounts and/or flows between the different system components. It should be noted that there may be additional valves throughout the gasification system 100 used to adjust different amounts and/or flows between the system components. In the illustrated embodiment, the controller 204 governs operation of a control device, such as the valve 196, to allow and/or block a flow of the slag 166 into the lock hopper 184, and valve 198 to depressurize the lock hopper 184. The controller 204 may also govern operation of additional valves to control an amount or adjust a flow of the feedstock 104, the gasifying agent 112, and the steam 116 that enters the gasifier 102. In certain embodiments, the control device may be part of a weighing mechanism that measures the amount of the feedstock 104 before it enters the gasifier 102. Additionally, the controller 204 may adjust the amount of quench liquid 132 entering the quench chamber 124 and the quench ring 134 to maintain a quench vaporization level of between approximately 90% to 100%. For example, if the quench vaporization level is less than a threshold (e.g., approximately less than 90% such as a quench vaporization level of 89%, 85%, 75%, 70%, or less), the controller 204 may provide a signal to at least one of pumps 150, 160, and/or 192 to decrease a flow of the second portion of black water 158 by increasing the flow of recirculation water to a nozzle scrubber through the nozzle scrubber pump 141. The controller 204 may control the pumps 141, 150, 160, and 192 in stages based on quench vaporization threshold limits.

In certain embodiments, the controller 204 may first control a flow of the first portion of black water 142 into the quench ring 134 to maintain the desired quench vaporization levels. If the quench vaporization levels within the quench chamber 124 are below the desired threshold, the controller 204 may adjust a flow of the second portion of black water 156, the fresh makeup water 186, or a combination thereof. Similarly, if the quench vaporization level is above a desired threshold, the controller may signal at least one of the pumps 150, 160, and/or 192 to increase the flow of the first portion of black water 142, the second portion of black water 156, the fresh makeup water 186, or a combination thereof. In certain embodiments, the controller 204 may use information provided via input signals to execute instructions or code contained on a machine-readable or computer-readable storage medium and generate one or more output signals 208 to the various control devices (e.g., valves 196 and 198 and pumps 150, 160, and 192) to control a flow quench liquids (e.g., the first and second portions of black water 142 and 156 and/or the fresh make up water 186) into the quench chamber 124, depressurization of the lock hopper 184, or any combination thereof.

Figure 2:
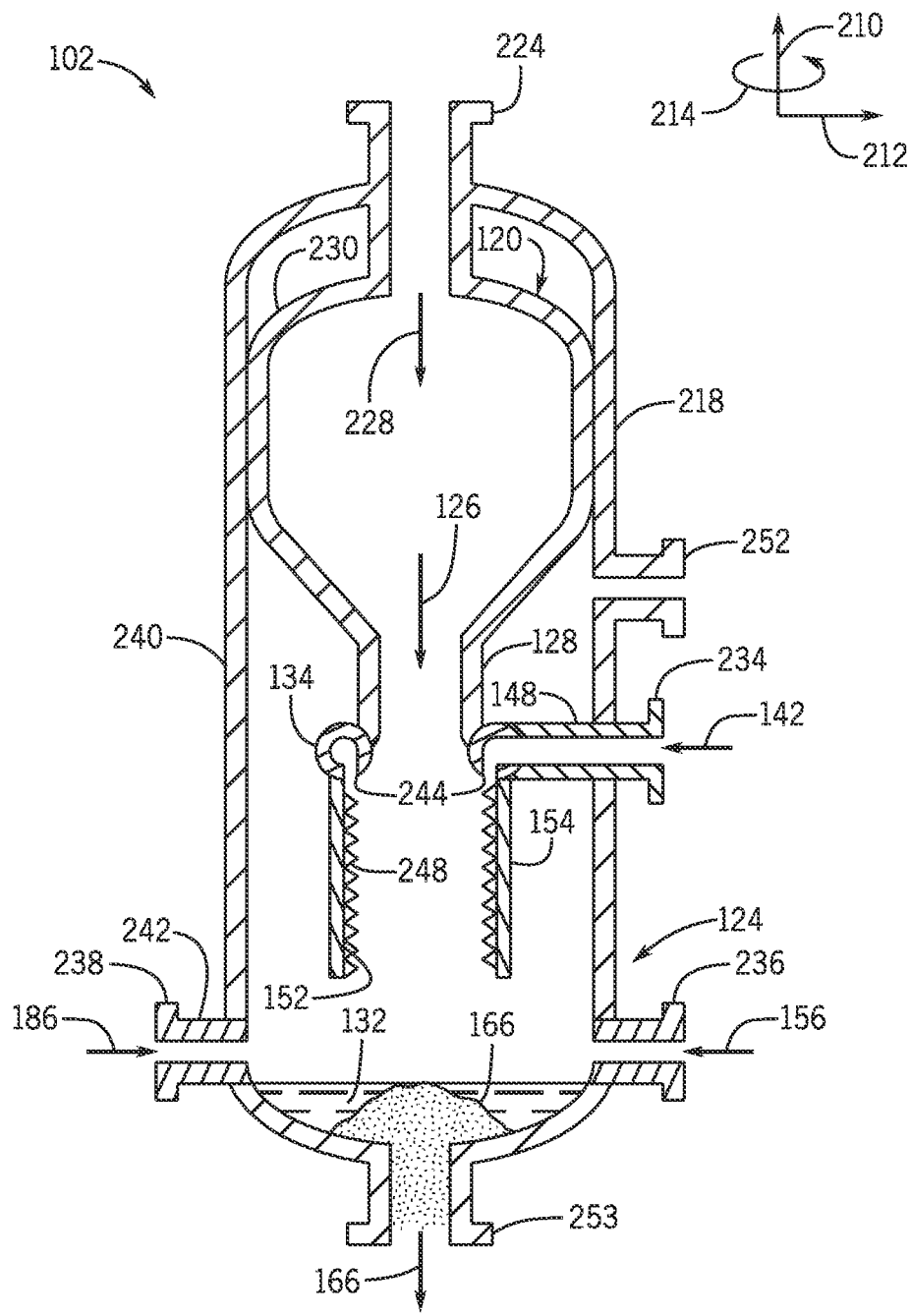
FIG. 2 is a cross-sectional view of an embodiment of a gasifier that may be used with the gasification system of FIG. 1.

As discussed above, the gasifier 102 may be configured to receive the quench liquid 132 from the scrubber 140, the lock hopper 184, or a combination thereof. Turning now to FIG. 2, an embodiment of the gasifier 102 is illustrated. The gasifier 102 may have an axial axis or direction 210, a radial axis or direction 212 away from axis 210, and a circumferential axis or direction 214 around axis 210. As noted above, the gasifier 102 includes the reactor 120 and the quench chamber 124 in a coaxial arrangement (e.g., along axial axis 210). The gasifier 102 includes an enclosure 218, also referred to as a shell (e.g., an annular shell), that functions as a housing or outer casing for the gasifier 102 (e.g., an annular vessel). The gasifier 102 may also include features that facilitate coupling of the gasifier 102 to a source for the feedstock 104 used to generate the syngas (e.g., untreated syngas 108 and treated syngas 172). For example, the gasifier 102 may include an inlet 224 (e.g., an axial port at the apex of the gasifier 102) configured to receive an injector that supplies the gasifier 102 with the feedstock 104, as indicated by arrow 228.

The gasifier 102 may also include a protective barrier 230. As discussed above, the gasifier 102 is configured to partially oxidize the feedstock 104 within the reactor 120 at temperatures in excess of approximately 700° C. and pressures of at least approximately 20 bar. The protective barrier 230 may improve the durability of the gasifier 102 by decreasing temperature and pressure effects associated with gasification of the feedstock 104. Accordingly, the protective barrier 230 may define the reactor 120 and the bottom end 128. The protective barrier 230 may act as a physical barrier, a thermal barrier, a chemical barrier, or any combination thereof. Examples of materials that may be used for the protective barrier 230 include, but are not limited to, refractory materials, refractory metals, non-metallic materials, clays, ceramics, cements, and oxides of aluminum, silicon, magnesium, and calcium. In addition, the materials used for the protective barrier 230 may be bricks, castable, coatings, or any other suitable material, or combination thereof. Furthermore, in certain embodiments the protective barrier 230 may include a cooling wall or a surface wetting film for additional vessel protection. In certain embodiments, the protective barrier 230 may also coat the quench ring 134 and the dip tube 154, as discussed above with reference to FIG. 1.

As noted above, the gasifier 102 may receive the quench liquid 132 from the scrubber 140 and the lock hopper 184. Accordingly, the gasifier 102 may include a first inlet 234, a second inlet 236, and a third inlet 238 (e.g., radial ports). While in the illustrated embodiment, the first, second, and third inlets 234, 236, and 238, respectively, are perpendicular to a surface 240 of the gasifier 102, the inlets may also be positioned at an angle 242 relative to the surface 240 (e.g., 1, 2, 3, 4, 5, 6, 7, 8, 9, 10 degrees or more). The first and second inlets 234 and 236, respectively, may be coupled to the scrubber 140 and provide the quench liquid 132 to the quench ring 134 and the quench chamber 124. For example, in the illustrated embodiment, the first inlet 234 is coupled to the line 148. As such, the first portion of black water 142 may flow into the quench ring 134, as indicated by arrow 142, to supply the quench liquid 132 to the quench chamber 124. The first portion of the black water 142 may flow out of the quench ring 134 through one or more openings 244 to form a water wall 248 (e.g., quench liquid 132) along the inner surface 152 of the dip tube 154.

As discussed above, a portion of the quench liquid 132 may vaporize within the dip tube 154 as the untreated syngas 108 and gasification by-products flow through the dip tube 154, as indicated by arrow 126. Additionally, the second inlet 236 may provide the second portion of black water 156 to the quench chamber 124 to supply additional quench liquid 132. Similarly, the quench chamber 124 may also receive the fresh makeup water 186 from the lock hopper 184 through the third inlet 238, as indicated by arrow 186. While in the quench chamber 124, the quench liquid 132 (e.g., the first and second portions of black water 142 and 156 and the fresh makeup water 186) may cool and separate the untreated syngas 108 from the slag 166. The untreated syngas 108 may then flow out of the gasifier 102 via a first outlet 252 for further processing (e.g., in the syngas treatment system 138), and the slag 166 may flow into the lock hopper 184 through a second outlet 258, as indicated by arrow 166. In other embodiments, the gasifier 102 may include additional inlets (e.g., radial ports) that supply the second portion of black water 156 and the fresh makeup water 186 to the quench chamber 124. For example, the additional inlets may be disposed axially and circumferentially (e.g., along axis 210 and 214) around the quench chamber 124 such that the second portion of black water 156 and the fresh makeup water 186 may enter the quench chamber 124 at multiple locations. This may facilitate uniform vaporization of the quench liquid 132. In other embodiments, the second portion of black water 156 and the fresh makeup water 186 may enter the quench chamber 124 via a single inlet (e.g., radial port).

By supplying the quench chamber 124 with the first and second portions of black water 142 and 156, respectively, the gasification system 100 may not exclude a separate black water treatment system. For example, as discussed above, black water (e.g., the first and second portions of black water 142 and 156) from the scrubber 140 may include fine particles of unconverted carbon from the untreated syngas 108. Because the black water (e.g., the first and second portions of black water 142 and 156) is circulated to the quench chamber 124, the fine particles of unconverted carbon may be removed from the gasification system 100 along with the slag 166. In addition, by supplying the quench chamber 124 with the second portion of black water 156, along with the fresh makeup water 186, the quench chamber 124 may operate at quench vaporization levels of between approximately 90% to 100%. Accordingly, an amount of black water (e.g., quench liquid 132 mixed with slag 166) generated by the gasification system 100 may be decreased.

Figure 3:
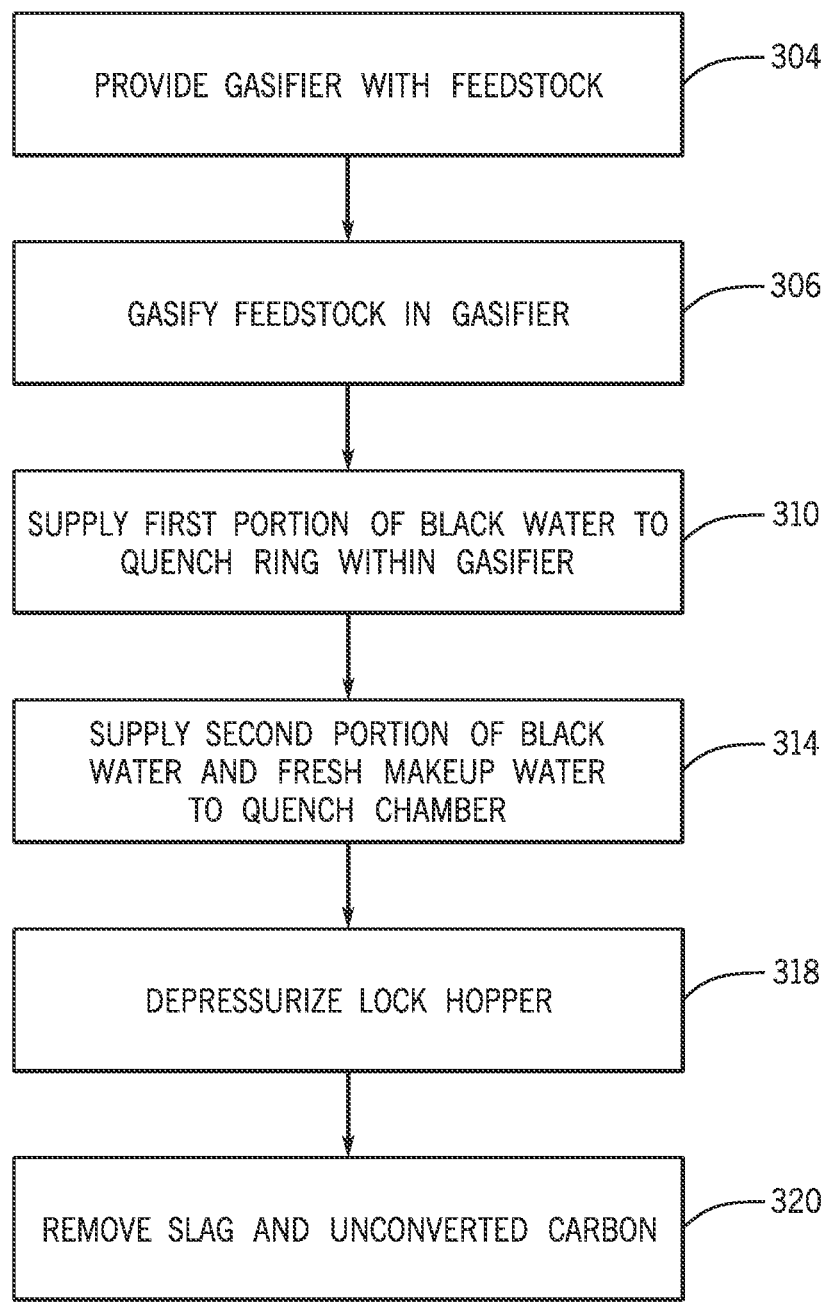
FIG. 3 is a block diagram depicting an embodiment of a method for circulating one or more quench liquids to the gasification system of FIG. 1.

Present embodiments also include a method that utilizes the gasification system 100 to remove the black water (e.g., the first and second portions of black water 142 and 156 and the quench liquid 132 mixed with slag 166). FIG. 3 illustrates a flow diagram of a method 300 by which a gasification system (e.g., the gasification system 100 described above) may remove the black water without the use of a black water treatment system. The method 300 includes providing the gasifier 102 with the feedstock 104 (block 304), and gasifying the feedstock 104 (block 306), as described above with reference to FIG. 1. The method 300 also includes supplying the first portion of black water 142 to the quench chamber 124 (block 310). The first portion of black water 142 may be supplied to the quench ring 134 to form the water wall 248 that begins to cool the untreated syngas 108 and the molten slag before entering the quench chamber 124, as discussed above with reference to FIG. 2. In addition to supplying the quench ring 124 with the first portion of black water 142, the method 300 also includes supplying additional quench liquid 132 (e.g., the second portion of black water 156 and the fresh makeup water 184 from the lock hopper 184) to the quench chamber 124 (block 314). In this way, the quench chamber may operate at quench vaporization levels of between approximately 90% to 100%. In addition, as discussed above, the second portion of black water 156 may include fine particles of unconverted carbon from the untreated syngas 108. As such, circulating the second portion of black water 156 to the quench chamber 124 may facilitate removal of between approximately 98% to 100% of unconverted carbon from the gasification system 100. Accordingly, the black water (e.g., the first and second portions of black water 142 and 156 and the quench liquid 132 mixed with the slag 166) may not need to be routed to a separate black water treatment system.

The method 300 further includes depressurizing the lock hopper 184 prior to removing the slag 166 and black water from the lock hopper 184 (block 318). As discussed above with reference to FIG. 1, the lock hopper 184 may be depressurized through the deaerator 180. Moreover, the lock hopper pump 192 may stop circulating the fresh makeup water 188 into the gasifier 102 prior to depressurization of the lock hopper 184. After depressurization of the lock hopper 184, the method 300 also includes removing the slag 166, and any black water including the unconverted carbon from the untreated syngas 108, for further processing (block 320). In certain embodiments, the lock hopper 184 may be replenished with the fresh makeup water 186 to continue providing the quench liquid 132 to the gasifier 102.

As described above, certain embodiments of the gasification system 100 may include continuously providing the gasifier 102 with the quench liquid 132 (e.g., the first and second portions of black water 142 and 156) to facilitate cooling of the untreated syngas 108 and the gasification by-products (e.g., molten slag). The gasification system 100 may also be configured to supply the gasifier 102 with the fresh makeup water 186 displaced from the lock hopper 184 during removal of the slag 166 from the gasifier 102. In this way, the gasification system 100 may operate at quench vaporization levels of between approximately 90% to 100%, and reduce the amount of black water generated throughout the gasification process. In addition, by circulating the black water (e.g., the first and second portions of black water 142 and 156) from the scrubber 140, the black water may be removed through the lock hopper 184. Accordingly, a black water treatment system may not be utilized to treat the black water generated in various gasification processes (e.g., during quenching and cleaning the untreated syngas 108). The configuration of the gasification system 100, according to the disclosed embodiments, may reduce the overall capital cost (e.g., equipment footprint) as compared to gasification systems that utilize black water treatment systems. Additionally, because the black water may be circulated to the gasifier 102, between approximately 98% to 100% of unconverted carbon may be removed with the slag 166. Moreover, utilizing the fresh makeup water 186 may decrease scale formation and plugging generally associated with the use of recycled grey water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasifier configured to remove black water, wherein the gasifier comprises a reactor configured to gasify a fuel to generate a syngas, and a quench chamber disposed downstream of the reactor, and the quench chamber is configured to cool the syngas generated in the reactor;
a syngas treatment system fluidly coupled to the gasifier and configured to receive the syngas generated in the gasifier, wherein the syngas treatment system is configured to supply the gasifier with a first portion of a quench liquid via a first flow path extending between the syngas treatment system and a first inlet of the gasifier and a second portion of the quench liquid via a second flow path extending between the syngas treatment system and a second inlet of the gasifier;
a lock hopper configured to receive gasification by-products generated in the reactor and supply a third portion of the quench liquid to the gasifier via a third flow path extending between a second outlet of the lock hopper and a third inlet of the gasifier; and
a deaerator coupled to the syngas treatment system and the lock hopper, wherein the deaerator is configured to depressurize the lock hopper.

2. The system of claim 1, comprising a fresh makeup water source coupled to the lock hopper, wherein the fresh makeup water source is configured to supply the lock hopper with fresh makeup water, and the fresh makeup water comprises the third portion of the quench liquid.

3. The system of claim 2, wherein the lock hopper is configured to displace the fresh makeup water upon receiving the gasification by-products from the gasifier to supply the third portion of the quench liquid to the gasifier.

4. The system of claim 1, comprising a quench ring configured to receive the first portion of the quench liquid, wherein the first portion of the quench liquid flows along an inner surface of a dip tube disposed downstream of the reactor and into the quench chamber.

5. The system of claim 4, wherein the dip tube comprises a protective barrier along the inner surface, and the protective barrier is configured to contact a flow of the syngas.

6. The system of claim 1, wherein the first and the second portions of the quench liquid comprise black water, and wherein the syngas treatment system is configured to treat the syngas to generate the black water.

7. The system of claim 1, wherein the quench chamber is coupled to the second and the third inlets and is configured to receive the second and third portions of the quench liquid.

8. The system of claim 1, comprising one or more pumps coupled to the quench chamber and configured to flow the second portion or the third portion of the quench liquid to the quench chamber.

9. The system of claim 1, comprising a controller programmed to control a flow of the first and second portions of the quench fluid such that the quench chamber maintains a quench vaporization level of between approximately 90% to 100% wherein the controller comprises:
one or more tangible, non-transitory, machine-readable media collectively storing one or more sets of instructions; and
one or more processing devices configured to execute the one or more sets of instructions to:
control a pump fluidly coupled to the first and second flow path to increase the flow of the first portion of the quench fluid through the first flow path such that a flow of the second portion of the quench fluid decreases through the second flow path to maintain quench vaporization levels within the quench chamber at between approximately 90% and 100%, wherein the first flow path is configured to supply the first portion of the quench fluid to a quench ring disposed adjacent to the reactor and upstream of the quench chamber, and wherein the second flow path is configured to supply the second portion of the quench liquid to the quench chamber.

10. A method, comprising:
providing a gasifier with a fuel, wherein the gasifier comprises a reactor and a quench chamber;
gasifying the fuel within the reactor to generate a syngas;
supplying a quench liquid to the gasifier, wherein a quench ring is configured to receive a first portion of the quench liquid from a syngas treatment system via a first flow path extending between the syngas treatment system and the gasifier to cool at least a portion of the syngas within a dip tube of the gasifier, wherein the syngas treatment system is fluidly coupled to the gasifier and configured to receive the syngas generated in the gasifier; and
supplying a second portion, a third portion, or a combination thereof of the quench liquid to the gasifier, wherein the second and the third portions of the quench liquid are added to the quench chamber, and wherein the second and the third portions of the quench liquid are compositionally distinct;
wherein the syngas treatment system supplies the third portion of the quench liquid to the quench chamber via a second flow path extending between the syngas treatment system and the gasifier; and wherein a lock hopper disposed downstream of the gasifier supplies the second portion of the quench liquid to the quench chamber via a third flow path extending between the lock hopper and the gasifier.

11. The method of claim 10, wherein the second portion comprises fresh makeup water from the lock hopper, and wherein the lock hopper receives gasification by-products generated in the reactor.

12. The method of claim 11, comprising adding gasification by-products to the lock hopper to displace the fresh makeup water and supply the second portion of the quench liquid to the quench chamber via a second flow path extending between the lock hopper and the gasifier.

13. The method of claim 10, wherein the first portion of the quench liquid and the third portion of the quench liquid comprise black water from the syngas treatment system, and wherein the syngas treatment system is configured to supply the the third portion of the quench liquid to the quench chamber via a second flow path extending between the syngas treatment system and the gasifier.

14. The method of claim 10, comprising depressurizing the lock hopper with a deaerator.

15. The method of claim 10, comprising maintaining a quench vaporization level within the quench chamber of between approximately 90% to 100%, wherein the second and the third portions of the quench liquid enable maintaining the quench vaporization level.

16. A system, comprising:
a vessel, comprising:
a reactor configured to gasify a fuel to generate a syngas;
a quench ring configured to receive a first quench fluid, wherein the first quench fluid cools the syngas;
a quench chamber configured to receive a second quench fluid, wherein the quench chamber comprises two or more inlets configured to supply the second quench fluid to the quench chamber, and wherein the second quench fluid comprises a first portion comprising black water, a second portion comprising fresh makeup water, or a combination thereof; and
a syngas treatment system fluidly coupled to the vessel and configured to receive the syngas generated in the reactor, wherein the syngas treatment system is configured to supply the quench ring with the first quench fluid via a first flow path extending between the syngas treatment system and the quench chamber and to supply the first portion of the second quench fluid via a second flow path extending between the syngas treatment system and the quench chamber;
wherein a lock hopper disposed downstream of the gasifier is configured to supply the quench chamber with the second portion of the second quench fluid via a third flow path extending between an outlet of the lock hopper and one of the two or more inlets of the gasifier.

17. The system of claim 16, comprising a scrubber coupled to the gasifier and configured to supply the quench ring with the first quench fluid and the quench chamber with the first portion of the second quench fluid.

18. The system of claim 16, comprising a deaerator configured to depressurize a lock hopper configured to receive gasification by-products generated in the reactor.

19. The system of claim 16, comprising a controller having instructions, wherein the instructions are configured to control operation of the system to maintain quench vaporization levels within the quench chamber at between approximately 90% and 100%.

* * * * *